United States Patent

[11] 3,596,000

[72] Inventors Karl-Anton Lutz;
Karl-Heinz Neufang, both of Munich, Germany
[21] Appl. No. 861,249
[22] Filed Sept. 26, 1969
[45] Patented July 27, 1971
[73] Assignee Siemens Aktiengesellschaft
Munich, Germany
[32] Priority Oct. 2, 1968
[33] Germany
[31] P 18 00 694.5

[54] PROCESS FOR TRANSMISSION OF MESSAGES IN TIME MULTIPLEX COMMUNICATION SYSTEM
4 Claims, 3 Drawing Figs.

[52] U.S. Cl. 179/15 AQ, 179/15 BS
[51] Int. Cl. H04j 3/00
[50] Field of Search 179/15 AQ, 15 BS

[56] References Cited
UNITED STATES PATENTS

| | | | |
|---|---|---|---|
| 2,910,541 | 10/1959 | Harris | 179/15 AQ |
| 3,504,125 | 3/1970 | Inose et al. | 179/15 BS |
| 3,504,126 | 3/1970 | Inose et al. | 179/15 BS |

*Primary Examiner*—Kathleen H. Claffy
*Assistant Examiner*—David L. Stewart
*Attorney*—Irons, Birch, Swindler & McKie

ABSTRACT: A time multiplex communication system for transmission of pulse code modulated signals, using several exchange stations. At each exchange station, varying delays in transmission are compensated for by insertion of delay lines in the transmission paths, to synchronize the pulse frames of the arriving lines with each other. The pulse frames of the departing lines are also synchronized with each other. At each exchange station, the next available time channel is assigned to a signal to be forwarded, as compared with the signal as it arrives at the station. The pulse frames of departing lines are delayed by a set time interval as compared with arriving lines, and the time slots within pulse frames which are assigned to arriving and departing signals are also so set, to require the minimum storage capacity at the exchange stations.

PROCESS FOR TRANSMISSION OF MESSAGES IN TIME MULTIPLEX COMMUNICATION SYSTEM

GENERAL DESCRIPTION

In the course of the development of long distance communication systems, the use of exchange systems operating according to the time multiplex principle has recently begun. In exchange system of this type, message signals between connected subscriber stations are transmitted in individual time channels. The message signals can appear in such channels in digital form.

In long distance communication installations operating according to the time multiplex principle wherein the message signals to be transmitted are preferably in digital form, as in the case with PCM (pulse code modulated) message signals, four-wire message signal transmission is often employed. This means that, for the message signal transmission direction in question, an individual time channel is used from among a number of time channels available for that message signal transmission direction. In principle, any time channel can be used for the signal transmission route. However, in the individual exchange stations, this requires considerable storage capacity for storage of the information concerning the time channels used for each connection. Such information is used, among other things, to identify the time channels used for each connection and to make the time channels available, upon the release of a connection, for further connections to be established.

In connection with the transmission of message signals between adjacent exchange stations, there ordinarily occur additional problems, due to the fact that the connection paths between the exchange stations are of different length and that the message signals transmitted over these connection paths arrive at the involved exchange stations with different delays. This means different pulse frame shifts in the entire long distance communication network. In order to eliminate the difficulties resulting therefrom, it is already known (Proceedings of the IEE, Vol. 113, No. 9, Sept. 1966, pp. 1420—1428) that the pulse frames of the departing and arriving connection paths in the individual exchange stations may be synchronized, through the insertion of delay lines into the individual connection paths. In conjunction with a long distance communication system of the just considered type, it is also already known (Proceedings of the IEE, Vol. 111, No. 12, Dec. 1964, pp. 1976—1980) to utilize in the connection path in question, in arriving and departing transmission direction, one and the same time channel within the pulse frame in question, for each connection. Thereby, for the purpose of transition from one time channel used in one connection path to a free time channel available in another connection path for the connection in question, in case no free time channel is found, whose time slots appear within the pulse frames in question with the same phase position as the time slots of the time channel used in the first mentioned connection path, an intermediate storage means is used, the total storage time of which corresponds to the duration of the length of a pulse frame. As different intermediate storage times must be considered, and thus there is required a corresponding number of intermediate stores with a total storage time each corresponding to the duration of a pulse frame, despite the possibility of utilizing these intermediate stores several times, the disadvantage of relatively high equipment requirements results.

It is therefore the task of the invention to show a way to proceed in order to be able to receive and forward message signals freely in time multiplex, in particular in PCM time multiplex exchange stations, without having the disadvantages of the above-considered known processes. To solve this task, the invention proceeds from a process for the reception and forwarding of message signals, in particular in a PCM time multiplex exchange station, of a time multiplex communication network, connected with at least two transmission paths which carry message signals, each in arriving and departing transmission direction, wherein the pulse frames of all lines departing from the exchange stations are synchronized among each other, and the pulse frames of all lines arriving at the exchange stations are synchronized among each other, with the aid of delay lines inserted into these lines. Further, upon the establishment of a connection proceeding over such an exchange station, to which a specific time channel is assigned in the pulse frame of the arriving line in question, in the pulse frame of the line in question departing in the direction of the establishment of the connection, in each case such a next free time channel is assigned, that the same time channel is used in each case within the pulse frame in question for the transmission of message signals in both transmission directions over a transmission path connected with such an exchange station. This process is characterized, according to the invention, by the fact that the delay lines inserted in the lines arriving at the exchange stations in question are so constructed that the pulse frames of the lines departing from the exchange stations in question possess a time position which is different from that of the pulse frames of the lines arriving at the exchange stations in question, due in each case to delay time determined according to a desired mean total time interval between the assigned time channels in each case. Moreover, for the transmission of message signals over such an exchange station, there are used in the one transmission path, in both transmission directions, two time channels differing in their phase position within the pulse frame in question, by a specific multiple, in particular twice, the predetermined delay time. Further, for the transmission of message signals over the exchange station in question on the other transmission path, two time channels are used which are in time coincidence in their phase position within the pulse frame in question.

This system has the considerable advantage, in contrast to the above known processes, that the intermediate stores to be provided for a time channel conversion can have a relatively low storage capacity. I.e. as will be evident later, in the exchange station in question relatively few intermediate stores are needed, each of which possesses a total storage time corresponding to twice the said fixed delay time. It is further of advantage that each intermediate store, during successive time segments, is usable for the intermediate storage of message signals which are transmitted in different connection establishment directions of one and the same connection, if, according to a suitable development of the process according to the invention, for the two time channels differing in their phase position within the pulse frame in question maximally by just the predetermined delay time period, time channels of such type are used that the time channel used on the line departing in the connection establishment direction in question follows the time channel used on the line arriving in the connection establishment direction in question by the said delay time period.

According to a further suitable development of the process according to the invention, in each case the same time channel within the pulse frame in question is used in one message signal transmission direction for the reception and forwarding of message signals. This makes possible in advantageous manner an especially simple identification of time channels used by each connection.

DETAILED DESCRIPTION

Figure 1:
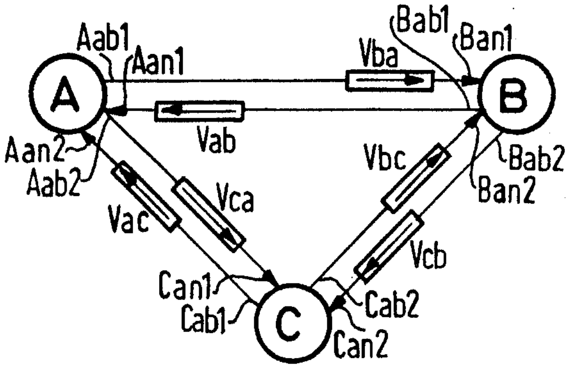
Figure 2A:
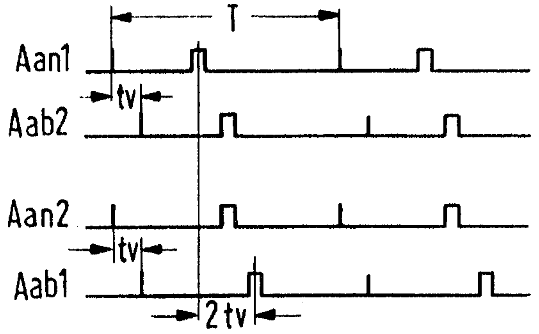
Figure 2B:
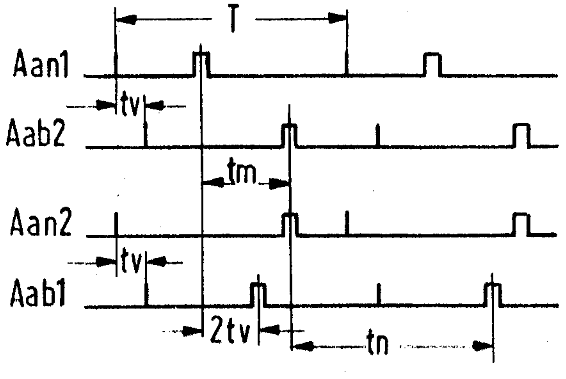

The invention is explained in more detail in the following with the aid of the attached drawings in which:

FIG. 1 shows schematically the development of a long distance communication network; and FIGS. 2*a* and 2*b* illustrate the reception and forwarding of message signals in the long distance communication network shown in FIG. 1 in accordance with the invention.

The long distance communication network shown in FIG. 1 is a time multiplex, and in particular a PCM time multiplex long distance communication network. The network includes three exchange stations, i.e. exchange stations A, B and C. These exchange stations A, B, and C are connected with each other in such a way that each exchange station is connected with each of the other exchange stations over a transmission path. Thereby each transmission path comprises in each case at least one arriving and at least one departing line. Delay lines are inserted into the lines arriving at the exchange stations. Thus, delay lines V*ab* and V*ac* are inserted into lines A*an*1 and A*an*122 2, arriving at exchange station A. Correspondingly, delay lines V*ba* and V*bc* are inserted into lines B*an*1 and B*an*2, arriving at exchange station B. Quite analogously, delay lines V*ca* and V*cb* are inserted into lines C*an*1 and and C*an*2, arriving at exchange station C. These delay lines serve to synchronize among each other the pulse frames of the lines arriving at each of the individual exchange stations A, B, and C. This means that all of the pulse frames of the lines arriving in each of the individual exchange stations have the same beginning and the same length.

In addition to the just mentioned synchronization of the pulse frames of all lines arriving at the individual exchange stations, in the long distance communication network shown in FIG. 1, the pulse frames of all lines departing from the individual exchange stations A, B, and C are also synchronized with each other, but this is not shown any further in FIG. 1. As will become evident, the pulse frames of all lines arriving and departing at the individual exchange stations are synchronized with each other in such a way that between the pulse frames of all arriving and all departing lines lies a specific time period *tv*.

Now that the long distance communication network shown in FIG. 1 has been considered, the process according to the invention will be explained in more detail with the aid of the diagrams shown in FIGS. 2*a* and 2*b*. According to FIG.2*a*, the pulse frames of lines A*ab*1 and A*ab*2, departing from exchange station A, are synchronized with each other. It shall be noted here that, moreover, the pulse frames of all lines departing from the individual exchange stations are similarly synchronized. The pulses frames of lines A*an*1 and A*an*2, arriving at exchange station A, are, as already mentioned above, also synchronized with the pulse frames of all lines arriving at the remaining exchange stations. Thereby a different time position is given to the pulse frames of lines A*ab*1, A*ab*2, B*ab*1, B*ab*2, C*ab*1 or C*ab*2, departing from the individual exchange stations, due to a specific delay time period *tv*, as compared to the pulse frames of lines A*an*1, A*an*2, B*an*1, B*an*2, C*an*1 or C*an*2, arriving at the individual exchange stations.

For the introduction of the mentioned delay time *tv*, delay lines V*ab*, V*ba*V*ac*, V*bc* or V*cb*, inserted into the lines arriving at the individual exchange stations, are determinative; however, in a given case, separate delay lines can be provided therefore.

Coming back to FIG. 2*a*, it will be noted that on line A*an*1, arriving at exchange station A, within pulse frame T, PCM signals appear in a time slot, indicated by an individual impulse, of a time channel with time slots appearing in successive pulse frames with the same time position in each case. Using the long distance communication network shown in FIG. 1 as a basis, these message signals are received in the assumed case over the said arriving line A*ab*1 from the direction of exchange station B. Further, exchange station A is connected with exchange station B over its departing line A*ab*1. In the pulse frames of this departing line A*ab*1 there are now used for the transmission of message signals between the two exchange stations A and B, time slots of a time channel, whose slots follow after the time slots of the tim channel used on arriving line A*an*1, by a time span of 2 *tv*, corresponding to a multiple, in particular to twice the delay time *tv* existing between these pulse frames. Thereby, the time channel used on departing line A*ab*1 appears after the time channel used on the arriving line A*an*1, by this time period 2 *tv*. As this method of proceeding is generally true in the case of the time channels used on both lines A*an*1 and A*ab*1, the time channel used in each connection is thus easily identified.

According to FIG. 2*a*, on lines A*ab*2 and A*an*2, connecting the exchange station A with the exchange station C, there are used for the transmission of message signals time channels whose individual time slots appear within the pulse frames in question each with such a phase position that they appear in time coincidence, a is illustrated in FIGS. 2*a* and 2*b*. Thereby, the time slots of the time channel used on the arriving line A*an*2 appear in each case delayed by exactly the duration of the delay time span *tv*, provided between the arriving and departing pulse frames in each case, after the time slots in question of the time channel used on the departing line A*ab*2, if one proceeds from the same pulse frame initiation point.

If there is available for onward transmission a free time channel within the same pulse frame as the time channel used on the arriving line, which free time channel is spaced within the time period 2 *tv* from the incoming channel, then conditions exist as shown in FIG. 2*a*. In this case the total storage time to be used for the connection in question, i.e. the time period during which the message signals, which are transmitted in both transmission directions with regard to the connection in question over the exchange station in question, must be intermittently stored amounts to a total of 2 *tv*. Thereby the intermediate store in question, as should be easily evident from FIG. 2*a*, can be utilized during this time period 2 *tv* for one and the same connection, successively, in both transmission directions. As intermediate stores, storage pairs are used, the store whereof in each case permit the delay of message signals for a total of 2 *tv*. The one store in each case thereby delays the message signals by a specific value up to a maximum of 2 *tv*, and the delay time of the other store of the storage pair, has a value which supplements this value to 2 *tv*.

It shall also be noted with regard to FIG. 2*a* that here it has been assumed that for the reception and forwarding of message signals in the transmission direction in question in each case the same time channel has been used within the pulse frame in question.

If no free time channel is available for the forwarding of the message signals received in a time channel within the pulse frames on the arriving line and within the said time period of 2 *tv*, then conditions exist as shown in FIG. 2*b*. In these circumstances as should be evident from FIG. 2*b*, it is necessary to intermediately store the message signals received on the said arriving line by a time period tm, until these can be transmitted in a free time channel on line A*ab*2, departing in the connection establishment direction in question. Correspondingly, the message signals appearing on line A*an*2, arriving in the opposite connection establishment direction, are to be delayed during a time period *tn*, until they can be forwarded in a time channel used on line A*ab*1, departing in the transmission direction in question. The total storage period *tm*+*tn* corresponds (as can be shown mathematically) to the sum of the duration of a pulse frame T plus time period 2 *tv*. This time period represents that total time interval which is to be provided for the intermediate storage of message signals, if a free time channel is not available within a time period corresponding to time period 2 *tv*, for the forwarding of message signals in the direction of establishment of the connection.

With regard to the above explained process according to the invention, it should be noted that for the case that the time period between the pulse frames on the departing and arriving lines in the individual exchange stations is selected to equal the width of two adjacent time slots, the time span lying between the time channels, or time slots, in the pulse frames on the arriving and departing line between an exchange station and an adjacent exchange station, has a total duration of four time channels or time slots widths. It has now been shown in this connection, in a system with pulse frames each having 32 time slots, pertaining to a corresponding number of time channels, that for 95 percent of the message signals received on an arriving line, for example A*an*1, on a line departing in the transmission direction in question, for example A*ab*2, of the time slots, appearing within the time period 2 *tv*, one is available for the forwarding of the message signals in question. To repeat —these conditions exist as shown in FIG. 2*a*.

Thus in most cases intermediate stores can be used which have a relatively short intermediate storage period and which can be utilized for a corresponding plurality of connections. For the remaining 5 percent of the message signals conducted over an exchange station, as can be seen from FIG. 2*b*—intermediate stores whose total delay time equals T+2 *tv* must be provided. Thereby the entire storage requirements are only relatively slightly increased, in order to insure that a free time channel can be assigned for the forwarding in the connection establishment direction in every case.

In closing, it should also be noted that, departing from the conditions shown in the drawings and previously explained, instead of further exchange stations in each case, also end-connection apparatus can be assigned to the exchange stations between whose subscriber stations message signals are to be transmitted over the exchange stations in question.

The invention has been described in conjunction with an illustrative embodiment which is susceptible of many modifications within the scope of the invention. Accordingly, the invention is not to be considered limited to this embodiment, but rather only by the scope of the appended claims.

We claim:

1. In a process for transmission of PCM message signals in a time multiplex system having a plurality of exchange stations connected together over at least two transmission paths which respectively carry signals in arriving and departing transmission directions, in which the pulse signals are transmitted in time slots of a pulse frame composed of a plurality of time slots, with the pulses of one time channel being equally spaced from each other in adjacent pulse frames wherein the pulse frame of all lines departing from each exchange station are synchronized with each other, the pulse frames of all lines arriving at each exchange station are synchronized with each other through insertion of delay lines in said arriving lines; wherein, upon establishment of a connection through an exchange station in a signal channel, with the channel arriving at an exchange station in one time channel, there is assigned the next free time channel to the signal for the line departing from the station; and wherein the same time channel within a pulse frame is used for transmission of a message in both transmission directions; the improvement comprising:

so selecting said delay lines that the pulse frames of the lines departing from the exchange stations are time-spaced from the pulse frames of the lines arriving at the same exchange stations by a delay time determined in accordance with a desired mean total time interval between the assigned time channels, using in one transmission path in both transmission directions for transmission of message signals through each exchange station, two time channels which are spaced apart by a whole number multiple of said delay time, and using in the other transmission path for transmission of message signals, through each exchange station, two channels which are in time coincidence within a pulse frame.

2. The process of claim 1 in which the time channels for said one transmission path are so selected that the time channel used in the arriving transmission direction procedes that used in the departing transmission direction, at each station by twice said delay time.

3. The method of claim 2 in which the same time channel is used for the reception and forwarding of message signals in one transmission direction.

4. The method of claim 1 in which the same time channel is used for the reception and forwarding of message signals in one transmission direction.